United States Patent
Torii et al.

(10) Patent No.: US 8,595,272 B2
(45) Date of Patent: Nov. 26, 2013

(54) FILE SERVER SYSTEM AND FILE MANAGEMENT METHOD USING MANAGEMENT POLICY AND SETTING FILE TO INDICATE MANAGEMENT COMPETENCE OF STORAGE AREA

(75) Inventors: Takashi Torii, Tokyo (JP); Yoshihiro Kajiki, Tokyo (JP)

(73) Assignee: NEC Corporation, Tokyo (JP)

( * ) Notice: Subject to any disclaimer, the term of this patent is extended or adjusted under 35 U.S.C. 154(b) by 276 days.

(21) Appl. No.: 12/530,737

(22) PCT Filed: Feb. 15, 2008

(86) PCT No.: PCT/JP2008/052498
§ 371 (c)(1),
(2), (4) Date: Jun. 10, 2010

(87) PCT Pub. No.: WO2008/111359
PCT Pub. Date: Sep. 18, 2008

(65) Prior Publication Data
US 2010/0250634 A1 Sep. 30, 2010

(30) Foreign Application Priority Data
Mar. 12, 2007 (JP) ................................. 2007-061962

(51) Int. Cl.
*G06F 17/30* (2006.01)
(52) U.S. Cl.
USPC ......................................................... 707/827
(58) Field of Classification Search
USPC .......... 707/759, 769, 694, 665, 785, 827, 781
See application file for complete search history.

(56) References Cited

U.S. PATENT DOCUMENTS

| | | | |
|---|---|---|---|
| 2003/0055972 A1* | 3/2003 | Fuller et al. | 709/226 |
| 2004/0148485 A1* | 7/2004 | Suzuki | 711/170 |
| 2005/0008163 A1* | 1/2005 | Leser et al. | 380/281 |
| 2006/0010150 A1* | 1/2006 | Shaath et al. | 707/102 |

FOREIGN PATENT DOCUMENTS

| | | |
|---|---|---|
| JP | 7-200477 A | 8/1995 |
| JP | 2000267923 A | 9/2000 |
| JP | 2006526851 A | 11/2006 |

OTHER PUBLICATIONS

Access Control: Principles and Practice written by Ravi S. Sandhu and Pierangela Samarati, IEEE Communications Magazine, Sep. 1994, 0163-6804, pp. 40-48.*
International Search Report for PCT/JP2008/052498 mailed Mar. 25, 2008.
Y. Ishii et al., "Proposal of the Command File Method for Management Operation of Extended Filesystem Function by Users", B-037, FIT2006: 5th Forum on Information Technology.

* cited by examiner

*Primary Examiner* — Robert Beausoliel, Jr.
*Assistant Examiner* — Hau H Hoang

(57) ABSTRACT

A management policy is given to a predetermined storage area by an administrator or a predetermined end user of end users as users of a plurality of client terminals. At this time, a file server generates a setting file in which the management policy is written, to set in a directory corresponding to the predetermined storage area. A write instruction (change data) is given by the administrator or the predetermined end user. The file server changes the management policy based on the change data.

16 Claims, 7 Drawing Sheets

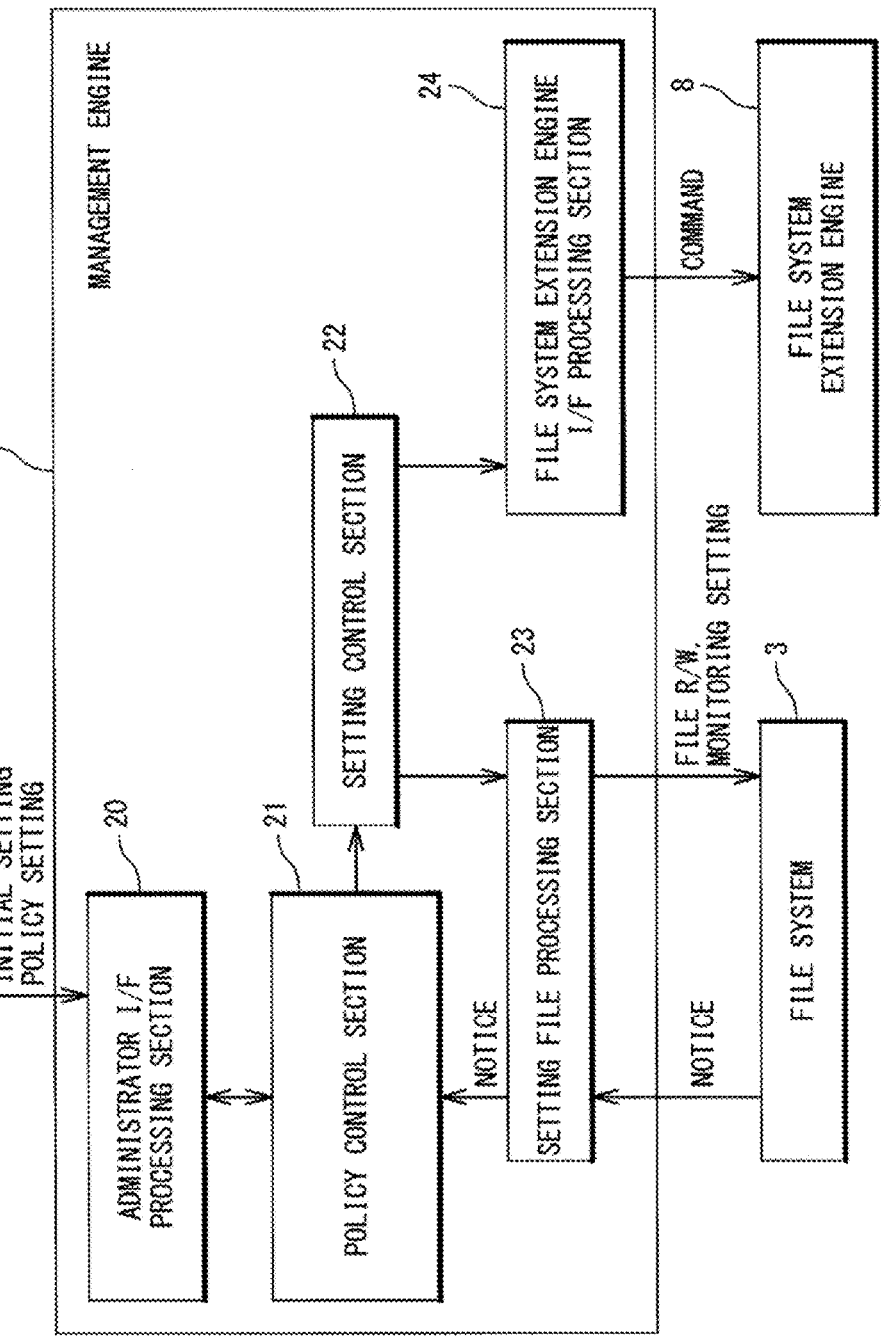

FILE SERVER SYSTEM AND FILE MANAGEMENT METHOD USING MANAGEMENT POLICY AND SETTING FILE TO INDICATE MANAGEMENT COMPETENCE OF STORAGE AREA

This application is the National Phase of PCT/JP2008/052498, filed Feb. 15, 2008, which claims a priority on convention based on Japanese Patent Application No. 2007-061962 filed on Mar. 12, 2007, and the disclosure thereof is incorporated herein by reference.

TECHNICAL FIELD

The present invention relates to a file server system and a file management method, in which a file is shared by using a file server (computer). This application claims a priority on convention based on Japanese Patent Application No. 2007-061962 filed on Mar. 12, 2007, and the disclosure thereof is incorporated herein by reference.

BACKGROUND ART

A file server is widely used for a simple method to share a file. The file server has been used for a relatively small group of users of client terminals as a file server in a department (a department file server). That is, the server has been used by a relatively small group of end users. In these years, integration of the file servers is promoted for the purpose of improvement of performance of equipments such as an NAS (Network Attached storage; an exclusive appliance for file server) and a server, and information integration trend. The integrated file servers have a size of a few terabytes and are used in the scale of thousands of users.

Such file servers are different from a conventional department file server, and are required to certainly backup data and operate around-the-clock without any down time. That is, it can be said that the integrated file servers are made to be used in a large scale and built as an infrastructure.

A maintenance cost increases in accordance with the usage in a large scale as an infrastructure of the file servers. Accordingly, reduction of the maintenance cost is a major problem for a user (an administrator) of the file server.

The administrator has to manage all files at a level for a most important file. However, all of the files stored in the file server are not necessarily important. Accordingly, the ordinarily-unnecessary maintenance cost for "regular backup", "storage for redundancy", "storage of access logs", and the like is also generated to the files unrelated to business. Such generation of the unnecessary maintenance cost occurs through even management of all the files without relation to a file attribution.

In order to handle such problems, various techniques for changing a management method in accordance with the file attributions such as importance of the files are developed and proposed. For example, a Hierarchical Storage Management (HSM) for moving a file of low importance to a low cost storage is proposed. When these methods are employed, the maintenance cost can be reduced, but indeed there is a problem that it is difficult to classify the files. In the conventional department file server, the administrator could classify the files because the number of end users is small. However, when the file servers are used in a large scale as an infrastructure, the administrator deals with up to thousands of end users and thus cannot know the importance of each file.

For example, the Hierarchical Storage Management (HSM) employs attributes such as an update time, an access time, and an access history of a file as a policy to classify the file. This is based on a concept that "a file that is accessed is highly important and requires a high performance" and "a file that is not accessed is less important and does not require a high performance". This policy is rational in a total performance. However, it is actually difficult to evenly classify all the files stored in the file server by using only the policy. As a matter of fact, among all the files, there are so many files that are not frequently accessed in the file server by a client terminal but are important. If the HSM moves such files to a low-speed storage, a problem of delaying an access time to the file may occur.

In the department file server that is accessed by a small group of end users, the administrator can know which file is important, but in the file servers accessed in the scale of hundreds of or thousands of end users, the administrator cannot know that and determine the policy simply.

In addition, when the file servers are used in a large scale as an infrastructure, the administrator generally tends to strongly believe that he works as an infrastructure administrator and not to concern contents of the files. On the contrary, a method can be considered in which the administrator does not set an importance level of whether or not each file is important, to each file but an end user dealing with the file sets the importance levels to all files by opening an administration GUI (Graphical User Interface) and commands to the end user. However, it will cause a matter of system security that anyone of thousands of end users can change the setting of the importance level.

It should be noted that "Proposal of the Command File Method for Management Operation of Extended File system Function by Users" (FIT2006: $5^{th}$ Forum on Information Technology) is made by Ishida and Sonoda, to propose a method for realizing a file system extension function by using a command file allocated on a directory. In this method, the command file is produced by a client program in a client terminal.

In order to efficiently manage the files with reduction of the maintenance cost, it is required to set an importance level to each of files and to appropriately reduce the maintenance cost. However, when the administrator sets the importance level to each file, the administrator has to check contents of all files to determine the levels, and accordingly the case cannot be realized substantially in the file servers used in a large scale as an infrastructure.

DISCLOSURE OF INVENTION

Accordingly, a subject matter of the present invention is to provide a file server system and a file management method, in which important files among all files can be managed with security maintained and a maintenance cost can be reduced by reducing a load of an administrator.

A file server system of the present invention includes a plurality of client terminals; and a file server shared by the plurality of client terminals. The file server includes a file system provided with a plurality of directories respectively corresponding to a plurality of storage areas; and a managing section. A management policy is given to a predetermined storage area of a plurality of storage areas by an administrator or a predetermined end user of end users as users of the plurality of client terminals. At this time, the managing section generates a setting file in which the management policy is set, and set the setting file in a directory of the plurality of directories corresponding to the predetermined storage area. A write command which contains change data indicative of a change of the setting file is given by the administrator or the predetermined end user. The managing section changes the management policy based on the change data.

BRIEF DESCRIPTION OF DRAWINGS

An object, an effect, and a feature of the above-mentioned invention are more clarified on the basis of descriptions of exemplary embodiments in relation with attached drawings:

FIG. 8 shows a configuration of a management engine 4 in the file server system according to the first exemplary embodiment of the present invention.

BEST MODE FOR CARRYING OUT THE INVENTION

Hereinafter, a file server system of the present invention will be described in detail with reference to the attached.

First Exemplary Embodiment

Figure 1:
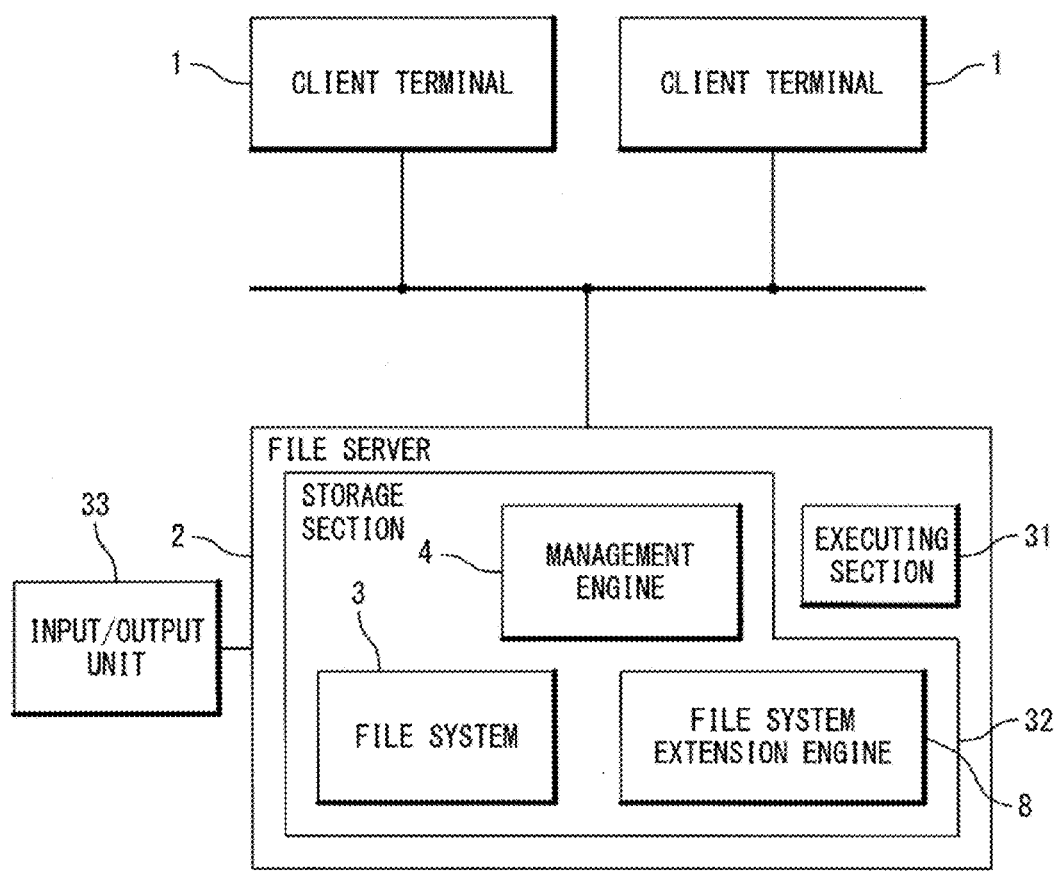
FIG. 1 shows a configuration of a file server system according to a first exemplary embodiment of the present invention.

FIG. 1 shows a configuration of a file server system according to a first exemplary embodiment of the present invention. The file server system includes a plurality of client terminals 1 and a file server 2 shared by the plurality of client terminals 1. The file server 2 is a computer, and includes a CPU (Central Processing Unit) as an executing section 31; and a storage section 32 that is a recording medium. A computer program is stored in the storage part 32 so as to be executed by the file server 2. The executing section 31 reads the computer program from the storage section 32 to execute the program, in starting up the file server 2. The storage section 32 has a file system 3, and the computer program includes a management engine 4 and a file system extension engine 8.

The management engine 4 is provided inside the file server 2 in an example shown in FIG. 1, but a configuration of providing the engine inside a server other than the file server 2 may be employed. In addition, a configuration where the management engine 4 manages a plurality of file servers 2 may be employed.

The file system extension engine 8 executes a certain additional process to the file system 3. For example, the additional process includes at least one of:

a process of file protection such as backup, snapshot, and replication;

a process of security such as virus scan and encryption; and a process of life cycle management such as HSM (Hierarchical Storage Management) and ILM (Information Lifecycle Management).

However, the additional process is not limited to these processes and whatever may be employed if it is an engine to execute a certain operation to the file server and its files. It should be noted that only one file system extension engine 8 is shown in FIG. 1, but a system configuration may be employed in which a plurality of engines are included to handle a plurality of additional processes.

Figure 2:
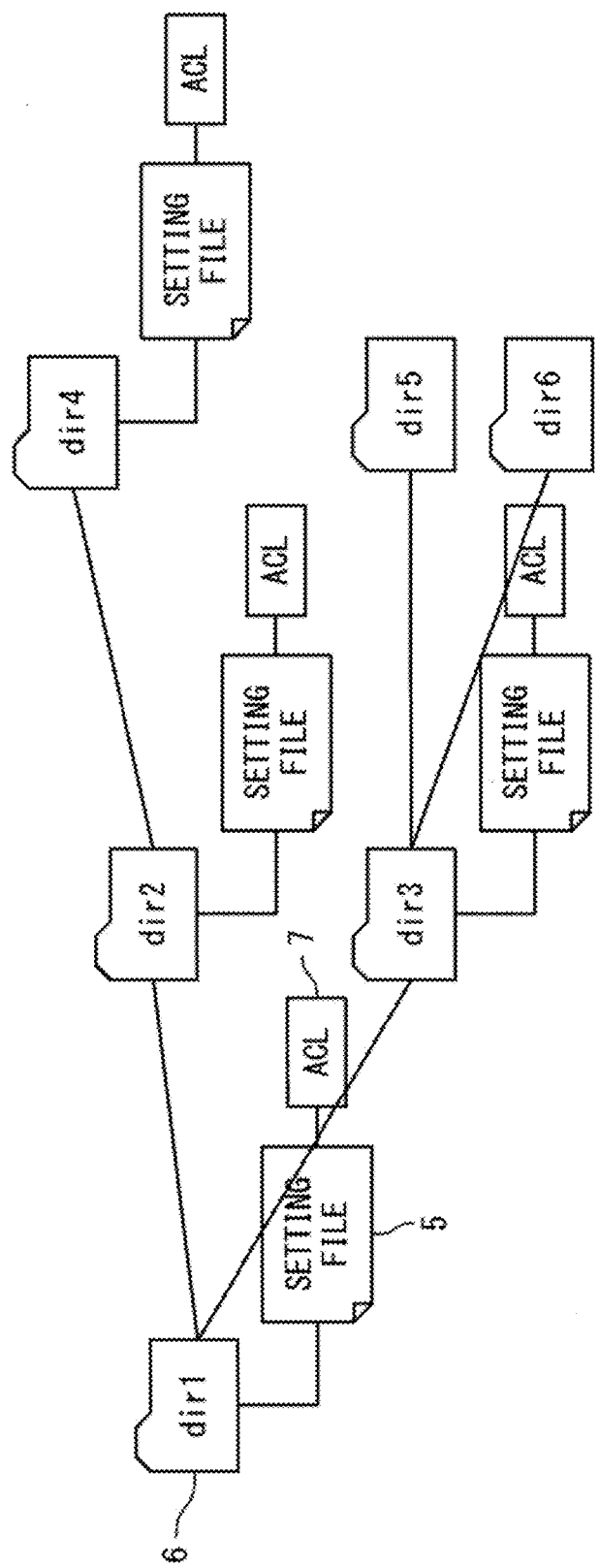
FIG. 2 shows one example of directories illustrating a plurality of directories 6 of a file system 3 of a file server 2 in the file server system according to the first exemplary embodiment of the present invention.

As shown in FIG. 2, the file system 3 includes a plurality of directories 6 related to a plurality of storage areas of the storage section 32, respectively.

Figure 3:
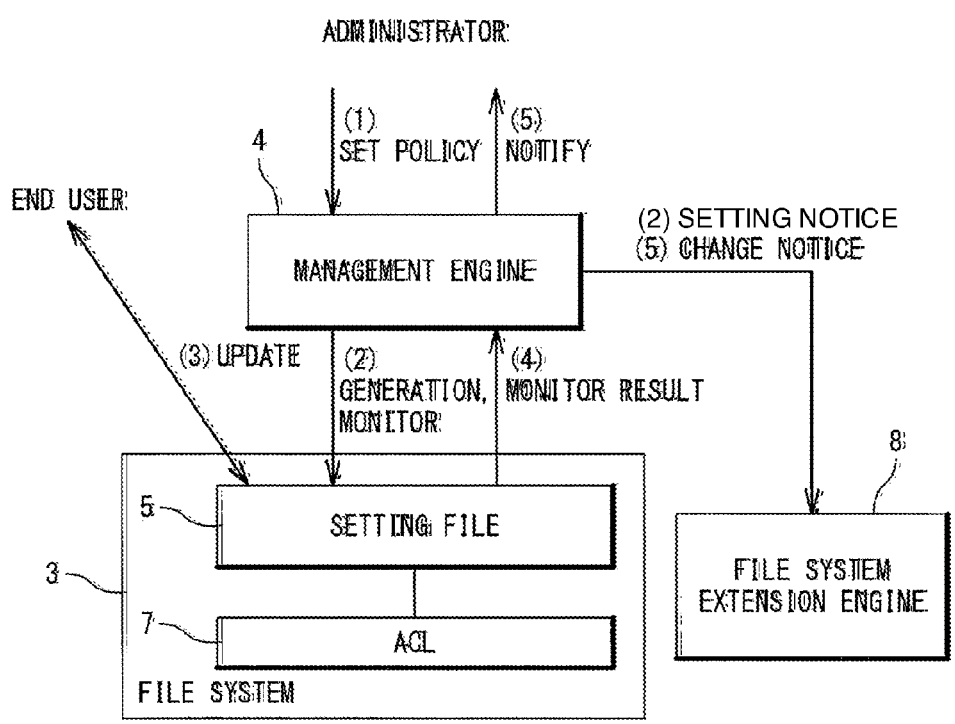
FIG. 3 is a diagram explaining an operation of the file server 2 in the file server system according to the first exemplary embodiment of the present invention.

An input/output unit 33 including a keyboard, a pointing device, a display unit, and a printer is connected to the file server 2. The input/output unit 33 is used by an administrator who maintains the file server 2. The administrator previously determines an end user allowed by the administrator among end users who are users of the plurality of client terminals 1, by using the input/output unit 33 and the file server 2. As shown in FIG. 3, the administrator or the previously determined end user gives a management policy related to a predetermined one of a plurality of storage areas to the file server 2. For example, the administrator gives the management policy related to the predetermined storage area to the file server 2 (policy setting (1) in FIG. 3). Meanwhile, the administrator can operate the input/output unit 33 via a network and also may operate the system via a virtual input/output unit like the remote log-in.

At this time, the management engine 4 of the file server 2 generates a setting file 5 to which the management policy has been set, and sets the file 5 in the directory 6 related to the predetermined storage area among the plurality of directories 6 (generation (2) in FIG. 3). The setting file 5 is generated in the above-mentioned directory 6 (a first directory) by the management engine 4. Every time the directories 6 (second, third, . . . directories) are added to the first directory, the directories are successively generated from an upper layer directory (first, second, third, . . . directories) by the management engine 4.

An access control list (ACL) 7 is applied to the setting file 5 to represent the previously determined end user. This ACL 7 may be individually set to the setting file 5 by the administrator, but the management engine 4 may appropriately set the setting file 5 based on the ACL by giving the ACL to the file server 2 as the policy. Accordingly, the setting file 5 cannot be updated (edited or changed) by every users and can be updated only by the end user allowed by the administrator. In this manner, the setting file 5 is treated as an important file among of all files.

After that, the management engine 4 monitors an access to the setting file 5 (Monitor (2) in FIG. 3).

In addition, when the setting file 5 is generated, the management engine 4 outputs a setting notice to the file system extension engine 8. The file system extension engine 8 executes an additional process to the file system 3 in accordance with the setting notice (Setting notice (2) in FIG. 3).

The administrator or the previously determined end user gives a write command to the file server 2 to write (update) the setting file 5. For example, the previously determined end user gives the write command to the file server 2. The write command includes change data that indicates a change of contents of the setting file 5. The administrator or the previously determined end user changes the management policy on the basis of the change data (Update (3) in FIG. 3).

As a monitor result of the access to the setting file 5, when the setting file 5 is updated, the management engine 4 sets the management policy depending on the change data to the setting file 5 (Monitor result (4) in FIG. 3). At this time, the management engine 4 outputs the change notice to the file system extension engine 8. The file system extension engine 8 executes the additional process to the file system 3 in accordance with the change notice (Change notice (5) in FIG. 3). In addition, the management engine 4 notifies the administrator (the input/output unit 33) that the setting file 5 has been updated (Notify (5) in FIG. 3). Accordingly, the administrator can know that the setting file 5 has been updated by the user (the previously determined end user) other than the administrator.

A case where the additional process executed by the file system extension engine 8 is subjected to the hierarchical storage management (HSM) and a file extension limitation will be described as an example.

In the hierarchical storage management (HSM), an importance low level file that is not accessed is moved from a primary storage to a large capacity and low cost secondary storage. Though which file is to be moved is set as the policy, it is difficult to manage the entire file system 3 on the basis of the same policy. Thus, according to the present invention, it is effective to delegate the setting of policy only to the end user allowed by the administrator. The management engine 4 reads the policy from the setting file 5 and controls the file system extension engine 8 to execute the HSM.

In the limitation of file extension (for example, allocated at the end of a file name and separated from a main part of the file name by a period), a security problem and needs not to allow storage of a private file on a company's file server are there. However, when the file extension is limited in the whole company, a case where a certain department requires an exception can be assumed, and thereby being hard to set the limitation. Therefore, according to the present invention, there are advantages that the limitation of the file extension can be set in a department level and that the change of the limitation can be performed only by the previously determined end user. For example, though the limitation has to be released in the whole company when CAD software used in a specific department automatically generates a file with a limited extension, the limitation of file extension can be easily released in a department level according to the present invention.

FIG. 8 is a diagram showing a configuration of the management engine 4. The management engine 4 includes an administrator I/F (interface) processing section 20, a policy control section 21, a setting control section 22, a setting file processing section 23, and a file system extension engine I/F processing section 24.

At first, the administrator gives a management policy related to a predetermined storage area of the file system 3 to the policy control section 21 via the administrator I/F processing section 20. At this time, the policy control section 21 generates the setting file 5 to which the management policy is set, and checks whether or not there is a problem in a load and a storage capacity of the file server 2. Here, when there is no problem in the load and storage capacity of the file server 2, the setting control section 22 requests issuing a write (W) command for writing the setting file 5 in the directory 6 related to a predetermined storage area. At this time, the setting file processing section 23 issues the write command and writes (sets) the setting file 5 into the directory 6 related to the predetermined storage area of the file system 3. In addition, the setting control section 22 requests issuing a command for representing the setting notice. The file system extension engine I/F processing section 24 issues the command for representing the setting notice, and the file system extension engine 8 executes an additional process to the file system 3 in accordance with the setting notice. At this time, the setting control section 22 requests issuing a monitor command for monitoring an access to the setting file 5. Then, the setting file processing section 23 issues the monitor command and monitors the access to the setting file 5.

When an error occurs in either one of the setting file processing section 23 and the file system extension engine I/F processing section 24, controls of retry and recovery processes are carried out by the setting control section 22. When a desired operation could not be carried out finally, the setting control section 22 informs the policy control section 21 of an error. The policy control section 21 notifies the administrator (the input/output unit 33) of data representing the error via the administrator I/F processing section 20.

In this manner, in accordance with the file server system according to the first exemplary embodiment of the present invention, an important file of all files can be managed with a security maintained and the maintenance cost can be cut since a load onto the administrator is reduced.

As described above, in an existing technique ("Proposal of file command system realizing management operation of file system extension function by user", (FIT2006: 5$^{th}$ Forum on Data Technology) by Ishida and Sonoda), the command file is generated by a client program in a client terminal. On the other hand, according to the file server system according to the first exemplary embodiment of the present invention, the file server 2 previously generates in the directory 6 (a predetermined storage area) of the file system 3, the setting file 5 to which the management policy (ACL 7) is set. In this manner, the file server 2 can limit the end user able to update the setting file 5 by using the ACL 7.

Additionally, in an existing technique (that the client terminal generates a command file), anyone can generate a file if having an authorization of write into a directory. On the other hand, in the file server system according to the first exemplary embodiment of the present invention, the file server 2 also can forbid an end user having the directory 6 (an end user to whom the directory 6 is allocated) from updating the setting file 5 by using the ACL 7.

Moreover, in the existing technique, all new generation and rename operations to the directory have to be monitored in monitoring update of files. On the other hand, in accordance with the file server system according to the first exemplary embodiment of the present invention, it is advantageous that the file server 2 is sufficient to monitor only the generated setting file 5, thereby being able to reduce a load of the monitoring.

Figure 4:
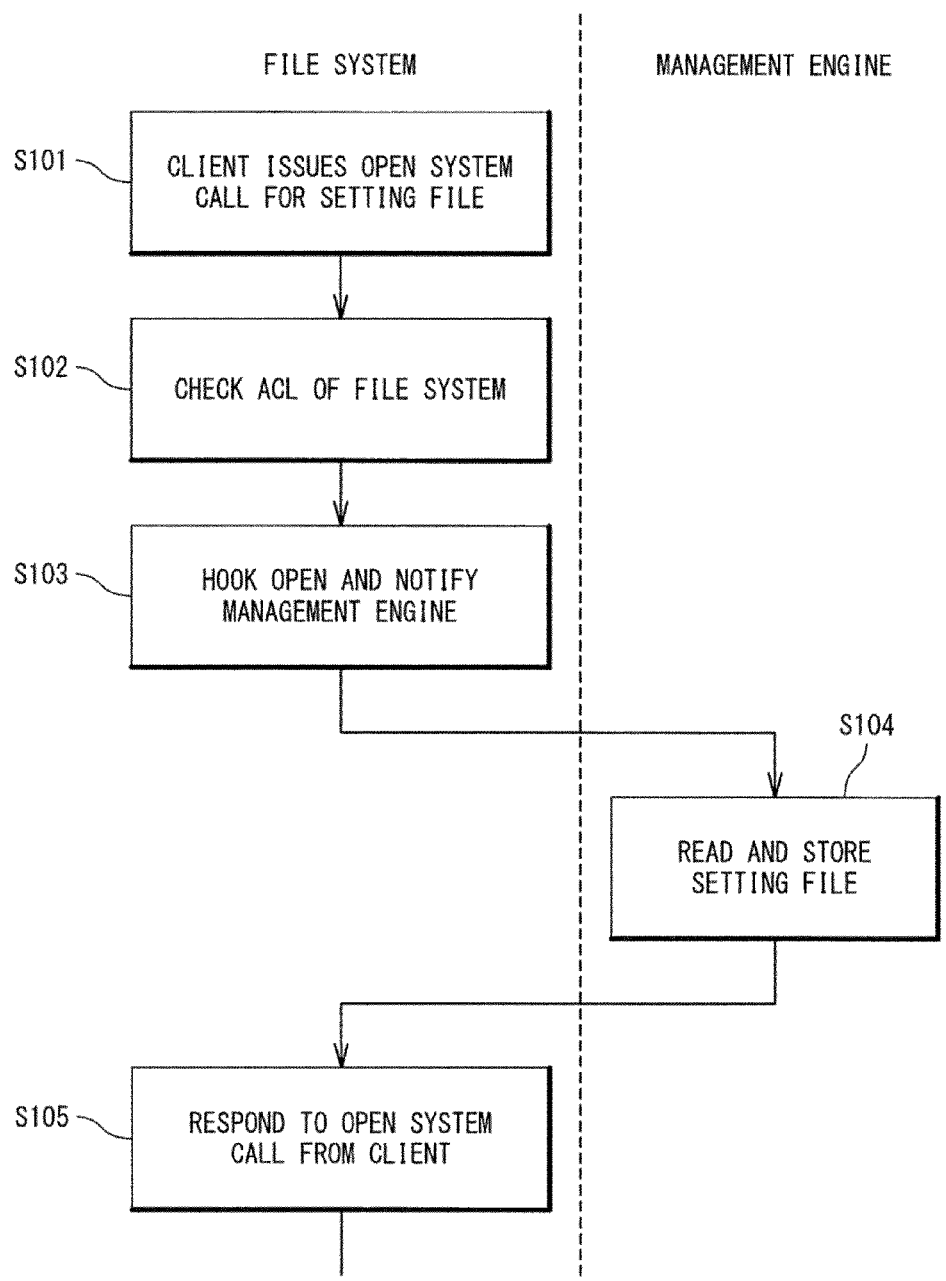
FIG. 4 is a flowchart showing an operation of opening a configuration file in the file server system according to the first exemplary embodiment of the present invention.
Figure 5:
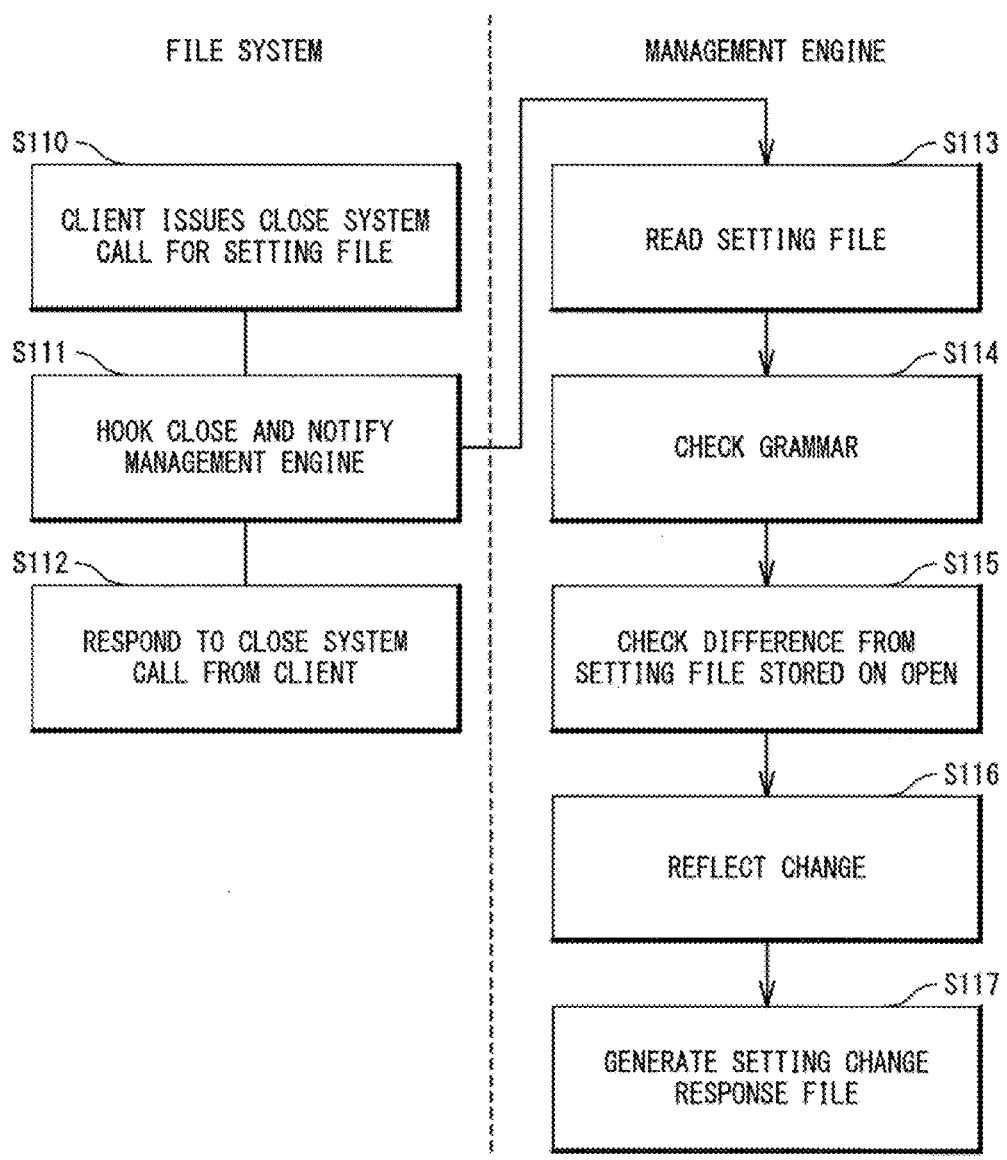
FIG. 5 is a flowchart showing an operation of closing the configuration file in the file server system according to the first exemplary embodiment of the present invention.

Referring to FIGS. 4 and 5, as the updating of the setting file 5, a procedure that a previously determined end user (the client terminal 1) opens the setting file 5 to edit it and saves and closes the setting file 5 after the editing operation will be described below.

FIG. 4 is a flowchart showing an operation of opening the setting file in the file server system according to the first exemplary embodiment of the present invention. That is, the procedure is shown when the client terminal 1 opens the setting file 5.

The client terminal 1 issues an open system call (step S101). When the open system call reaches the file system 3 of the file server 2, an end user is firstly checked by an ACL function (step S102).

Only the end user having access permission to the setting file 5 can perform an opening operation. In the opening, the system call is hooked at a layer of the file system 3, and the hooking is notified to the management engine 4 (step S103).

The hooking is synchronously carried out, and a reply is not returned to the client terminal 1 until the management engine 4 returns opening permission.

The management engine 4 receives a notice of the hooking of the open system call and reads and stores the present setting file 5 (step S104). This process is executed to "check a changed portion compared to the previous file when the client terminal 1 rewrites the setting file 5" and "return the changed setting file 5 to the original file when some error occurs".

Here, if the hooking is performed when the management engine 4 reads the setting file 5, the process goes into an infinite loop. Accordingly, the file system 3 is configured to be able to set a privilege user to whom the hooking is not carried out, and the management engine 4 is determined as the privilege user.

When the management engine 4 reads the setting file 5 and returns the process to the file system 3, a response of the open system call is returned to the client terminal 1 (step S105). When opening the setting file, the client terminal 1 edits the setting file 5.

FIG. 5 is a flowchart showing an operation of closing the setting file in the file server system according to the first exemplary embodiment of the present invention. That is, a procedure is shown that the client terminal 1 saves and closes the setting file 5 after the editing operation.

The client terminal 1 issues a close system call to save and close the setting file 5 (step S110). The close system call is hooked at an entrance of the file system 3 in the same manner as that of the opening, and the hooking is notified to the management engine 4 (step S111). However, this notice is asynchronously carried out. That is, a response of the close system call is returned to the client terminal 1 without waiting for the returning of a response from the management engine 4 (step S112). Reflection of the change may take long time, and accordingly if the close response is not returned until the reflection, some operating system (OS) of the client terminal 1 determines a stall of the file server 2 and terminates a connection.

The management engine 4 receives the hooking of the close system call and firstly reads the setting file 5 (step S113). The management engine 4 checks whether or not there is a grammatical error in the read setting file 5 (step S114).

Next, the management engine 4 checks a difference between the read setting file 5 and the setting file 5 at the time of opening (step S115). After that, the management engine 4 carries out a control to reflect the difference (changed portion) (step S116). That is, the management engine 4 reflects a difference on the file system extension engine 8.

When generating the setting file 5, the management engine 4 generates a setting change response file 9 that can be browsed by the administrator and the previously determined end user, and sets the file inside the directory 6. The setting change response file 9 represents whether or not the setting file 5 has been normally updated. For example, the management engine 4 generates an error when there is a failure on the system in changing the setting file 5. In this case, since the setting file 5 is not normally updated, the setting change response file 9 includes data representing the above-mentioned error (step S117). In this manner, the client terminal 1 reads the setting change response file 9 and can check whether or not the setting file 5 has been normally updated.

In addition, it could be understood that the setting file 5 is being updated until the setting change response file 9 is generated. To express this, upon reception of a write command (the change data), the management engine 4 may delete the previous setting change response file 9 from the directory 6.

Figure 6:
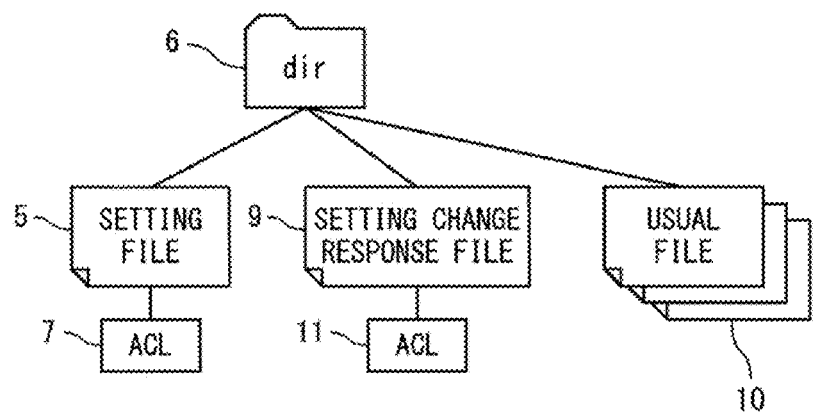
FIG. 6 shows one example of the directory 6 of the file system 3 of the file server 2 in the file server system according to the first exemplary embodiment of the present invention.

FIG. 6 shows one example of the directory 6 of the file system 3 of the file server 2. In the description shown in FIG. 6, the setting file 5 and the setting change response file 9 are arranged under the directory 6 in addition to a normal file 10, and the setting file 5 and the setting change response file 9 are generated by the management engine 4.

The setting file 5 can be updated only by the previously determined end user by use of the ACL 7.

The ACL 11 is set to the setting change response file 9. The ACL 11 can be read only by the previously determined end user and represents that the setting change response file 9 can be updated only by the management engine 4.

In order to set the ACL 7 of the setting file 5 by the management engine 4, it can be configured to forbid an access even from an end user to whom the directory 6 is allocated. In that case, the update of the setting file 5 even from the end user to whom the directory 6 is allocated is not permitted.

Though it may be considered that when the setting file 5 cannot be accessed, the directory 6 also cannot be deleted, the file deletion from the directory 6 can be realized if the user has an access right for write into the directory 6 itself.

When the previously determined end user (the client terminal 1) deletes the setting file 5 for purposes other than the deletion of the directory, a state lack of the setting file 5 is produced. In this case, a setting file of the upper directory is succeeded. When the client terminal 1 carries out an operation such as a file generation in the directory 6, the management engine 4 detects the lacking of the setting file 5, and the operation is carried out in a same setting as the setting file 5 of the upper directory. In addition, the same setting is also succeeded to a subdirectory that is a lower directory to the upper directory. When there are many subdirectories, it may take long time, but since the setting change response file 9 is not generated until the end, it can be known that the client terminal 1 is in a processing state now.

Additionally, when a setting to forbid the generation of file with a specific extension to the setting file 5 is employed, an existing file that is the setting file 5 may be a forbidden file. In this case, the management engine 4 can automatically delete the existing file, but it is very dangerous. For example, an important file may be deleted due to a setting mistake. Accordingly, in order to avoid such danger, the management engine 4 does not automatically delete a file even when the file is treated as the forbidden file, and the file is listed on the setting change response file 9. However, a collective deletion can be easily realized by moving the listed files to a temporal dust box or separately providing a configuration of the collective deletion so as to collectively delete the listed files.

Moreover, a full pathname of the directory 6 is sometimes included in the setting file 5. In this case, when a name is changed (RENAME) in the upper directory, the setting file 5 of the lower directory has to be entirely changed successively. This requires a great load to be a matter. To handle this, the setting file 5 is configured not to include the pathname. Alternatively, an inode number of the directory 6 may be inserted. Accordingly, even when the name change and the MOVE are carried out, it is not required to change the setting file 5, resulting in the reduction of the load.

Furthermore, when the setting file 5 is not set to the directory 6 to which the file has to be set, it is preferable to compare the inode numbers between the setting file 5 and the directory 6. In this case, check can be made by comparing the inode numbers of the setting file 5 and the directory 6. When the setting file 5 is not set to the directory 6 to which the file has to be set, it is desirable to generate the new setting file 5 by succeeding the setting file 5 of the upper directory.

Second Exemplary Embodiment

Next, a second exemplary embodiment of the present invention will be described. Here, an overlapping portion thereof with that of the first exemplary embodiment will be omitted.

Figure 7:
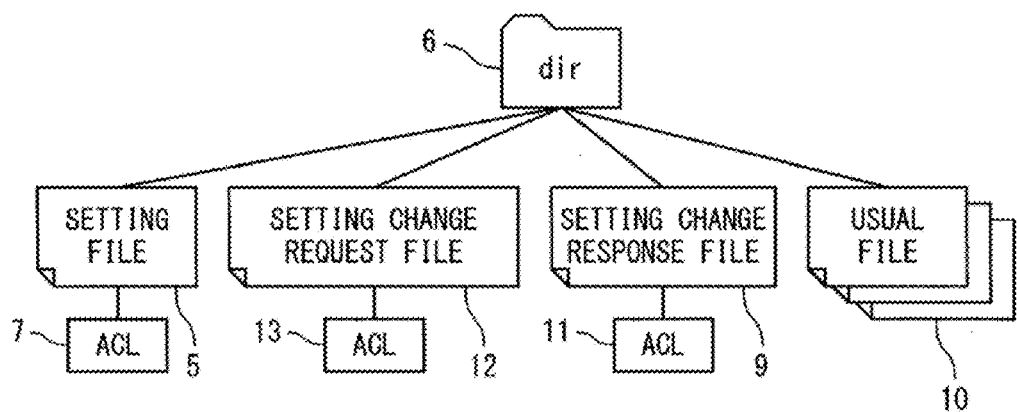
FIG. 7 shows one example of the directory 6 of the file system 3 of the file server 2 in the file server system according to a second exemplary embodiment of the present invention.

FIG. 7 shows one example of the directory 6 of the file system 3 of the file server 2 in the file server system according to the second exemplary embodiment of the present invention. In the second exemplary embodiment, the management engine 4 of the file server 2 generates a setting change request file 12 when the setting file 5 is generated, and sets the file in the directory 6. The administrator or the previously determined end user gives a write command (change data) by using the input/output unit 33 and the client terminals 1. At this time, the management engine 4 sets the access right for change only by the administrator or the previously determined end user to the setting change request file 12. When the administrator or the previously determined end user changes the change data to the setting change request file 12, it is checked whether or not there is a problem in a load and a storage capacity of the file server 2. Here, when there is not the problem in the load and the storage capacity of the file server 2, the management engine 4 reads the change data from the setting change request file 12 and changes the management policy on the basis of the change data.

In the present exemplary embodiment, the administrator (the input/output unit 33) or the client terminal 1 (a specific end user; the previously determined end user) describes the change data to the setting change request file 12. In this case, since the setting file 5 before the changing remains, the management engine 4 needs not read the file in the opening operation.

Unlike the first exemplary embodiment, in a directory configuration shown in FIG. 7, the ACL 7 of the setting file 5 is set so as not to be updated by the client terminals 1 (all end users).

The client terminal 1 (the specific end user) updates the setting change request file 12 and instructs to update the setting file 5. When an access to the setting change request file 12 is monitored and the setting change request file 12 is written (updated) in the file system 3, it is notified to the management engine 4. The management engine 4 reads the setting change request file 12 and carries out a control to reflect the setting change on the file system extension engine 8. That is, when the setting change request file 12 is updated by the specific end user, it is notified from the file system to the policy control section 21 via the setting file processing section 23 in the same manner as that of the first exemplary embodiment. In order to confirm whether or not the updating of the setting file 5 by the setting change request file 12 is permitted by comparing with and checking the policy, the policy control section 21 checks whether there is a problem or not by comparing with and checking various data such as the load and the storage capacity of the file server 2. When the updating of the setting file 5 is permitted, the policy control section 21 instructs the setting control section 22 to update the setting file 5.

After reflecting the setting in accordance with contents of the setting change request file 12, the management engine 4 reflects the change data described in the setting change request file 12 on the setting file 5 (refer to FIG. 7) in the file system 3. Subsequently, the management engine 4 resets (clears) the contents of the setting change request file 12 (for example, sets it as a file with a byte length of 0). In the management engine 4, the updating of the contents of the setting file 5 in the file system 3 and the resetting of the setting change request file 12 are carried out via the setting control section 22 and the setting file processing section 23 in accordance with the instruction from the policy control section 21.

In the present exemplary embodiment, an ACL 13 that can be accessed and updated only by the limited specific end user is given to the setting change request file 12. In addition, the setting file 5 can be accessed only by the administrator (the management engine), and the ACL 7 that does not permit the accesses such as the updating operation and the deleting operation is given to the end user.

In accordance with the file server system according to the second exemplary embodiment of the present invention, a process of reading and storing the setting file 5 on the opening (S104 in FIG. 4) is unnecessary, unlike the first exemplary embodiment. For this reason, there is an advantage that an opening operation is simplified and the management engine 4 is not required to retain the setting file 5 before the changing. Accordingly, in addition to an effect of the first exemplary embodiment, the maintenance cost can be reduced, compared to the first exemplary embodiment.

As described above, the present invention has been described by using the exemplary embodiments as example, but it would be obvious that the present invention is not limited only to the configurations of the above-described exemplary embodiments and includes various modifications that can be carried out by a person skilled in the art within a scope of the present invention.

As described above, according to the file server system of the present invention, the important files among all files can be managed with security maintained, and the maintenance cost can be cut by reducing the load of the administrator.

The invention claimed is:

1. A file server system comprising:
a plurality of client terminals; and
a file server shared by said plurality of client terminals,
wherein said file server comprises:
a file system provided with a plurality of directories respectively corresponding to a plurality of storage areas; and
a managing section configured to generate a setting file, a setting change response file, and a setting change request file, in a directory of said plurality of directories which corresponds to a predetermined storage area of said plurality of storage areas, wherein said setting file, setting change response file, and setting change request file are accessible by only an administrator or a predetermined end user of end users as users of said plurality of client terminals, by setting a management policy as an access right to said file system, when said management policy is given to indicate that said administrator or said predetermined end user has a management competence of said predetermined storage area,
wherein said setting change response file represents whether or not an addition process has been normally executed so that said setting file has been normally updated,
wherein said setting change request file is changed by said administrator or said predetermined end user, and notifies change data to a file system extension section to indicate a content of a change in said setting change request file,
wherein said managing section monitors access to said setting file, and notifies said change data indicative of said content of said change of said setting file to said file system extension section when said setting file is updated.

2. The file server system according to claim 1, wherein:
said file system extension section executes said addition process to said file system based on said change data.

3. The file server system according to claim 2, wherein and said managing section reflects a content of said setting change request file onto said setting file when there is no problem on a load of said file server and a storage capacity.

4. The file server system according to claim 2, wherein said addition process contains at least one of file protection, security, and life cycle management.

5. A file server shared by a plurality of client terminals, comprising:
a file system provided with a plurality of directories respectively corresponding to a plurality of storage areas; and
a managing section configured to generate a setting file, a setting change response file, and a setting change request file, in a directory of said plurality of directories which corresponds to a predetermined storage area of said plurality of storage areas, wherein said setting file, setting change response file, and setting change request file are accessible by only an administrator or a predetermined end user of end users as users of said plurality of client terminals, by setting a management policy as a access right to said file system, when said management policy is given to indicate that said administrator or said predetermined end user has a management competence of said predetermined storage area,
wherein said setting change response file represents whether or not an addition process has been normally executed so that said setting file has been normally updated,
wherein said setting change request file is changed by said administrator or said predetermined end user, and notifies change data to a file system extension section to indicate a content of a change in said setting change request file,
wherein said managing section monitors access to said setting file, and notifies said change data indicative of said content of said change of said setting file to said file system extension section when said setting file is updated.

6. The file server according to claim 5, wherein:
said file system extension section executes said addition process to said file system based on said change data.

7. The file server according to claim 6, wherein
said managing section reflects a content of said setting change request file onto said setting file when there is no problem on a load of said file server and a storage capacity.

8. The file server according to claim 6, wherein said addition process contains at least one of file protection, security, and life cycle management.

9. A file management method using a file system which is shared by a plurality of client terminals and provided with a plurality of directories corresponding to a plurality of storage areas, comprising:
setting a management policy as an access right to said file system, when said management policy is given to indicate that an administrator or a predetermined end user of end users as users of said plurality of client terminals has a management competence of a predetermined storage area of said plurality of storage areas; and
generating a setting file, a setting change response file, and a setting change request file, in a directory of said plurality of directories which corresponds to said predetermined storage area, wherein said setting file, setting change response file, and setting change request file are accessible by only said administrator or said predetermined end user,
wherein said setting change response file represents whether or not an addition process has been normally executed so that said setting file has been normally updated,
wherein said setting change request file is changed by said administrator or said predetermined end user, and notifies change data to a file system extension section to indicate a content of a change in said setting change request file,
wherein said managing section monitors access to said setting file, and notifies said change data indicative of said content of said change of said setting file to said file system extension section when said setting file is updated.

10. The file management method according to claim 9, further comprising:
executing said addition process to said file system; based on said change data.

11. The file management method according to claim 10, further comprising:
reflecting a change content of said setting change request file onto said setting file when there is no problem on a load of said file server and a storage capacity.

12. The file management method according to claim 10, wherein said addition process contains at least one process of file protection, security, and life cycle management.

13. A computer-readable recording medium in which a computer-executable program code is stored to cause a computer to attain a file management method using a file system which is shared by a plurality of client terminals and provided with a plurality of directories corresponding to a plurality of storage areas, wherein said file management method comprises:
setting a management policy as an access right to said file system, when said management policy is given to indicate that an administrator or a predetermined end user of end users as users of said plurality of client terminals has a management competence of a predetermined storage area of said plurality of storage areas; and
generating a setting file, a setting change response file, and a setting change request file, in a directory of said plurality of directories which corresponds to said predetermined storage area, wherein said setting file, setting change response file, and setting change request file are accessible by only said administrator or said predetermined end user,
wherein said setting change response file represents whether or not an addition process has been normally executed so that said setting file has been normally updated,
wherein said setting change request file is changed by said administrator or said predetermined end user, and notifies change data to a file system extension section to indicate a content of a change in said setting change request file,
wherein said managing section monitors access to said setting file, and notifies said change data indicative of said content of said change of said setting file to said file system extension section when said setting file is updated.

14. The computer-readable recording medium according to claim 13, wherein said file management method further comprises:

executing said addition process to said file system based on said change data.

15. The computer-readable recording medium according to claim 14, wherein said file management method further comprises:

reflecting a change content of said setting change request file onto said setting file when there is no problem on a load of said file server and a storage capacity.

16. The computer-readable recording medium according to claim 14, wherein said addition process contains at least one process of file protection, security, and life cycle management.

* * * * *